April 9, 1935. J. S. BENNETT 1,996,896
CAGING AND RESETTING MEANS FOR GYROSCOPICALLY
CONTROLLED NAVIGATION INSTRUMENTS
Filed April 28, 1932 2 Sheets-Sheet 1

INVENTOR
JOSEPH S. BENNETT
BY
ATTORNEY

April 9, 1935.   J. S. BENNETT   1,996,896
CAGING AND RESETTING MEANS FOR GYROSCOPICALLY
CONTROLLED NAVIGATION INSTRUMENTS
Filed April 28, 1932   2 Sheets-Sheet 2
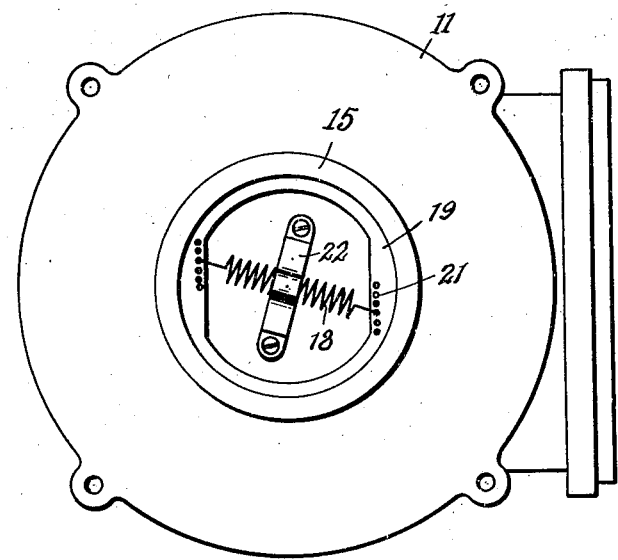
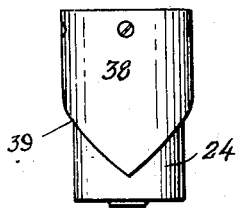
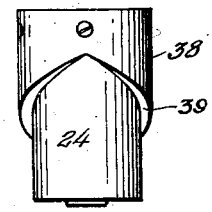
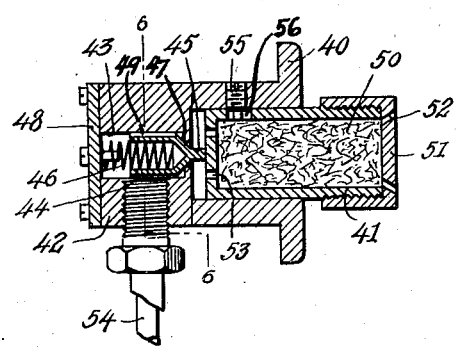
INVENTOR
JOSEPH S. BENNETT
BY
ATTORNEY Patented Apr. 9, 1935

1,996,896

UNITED STATES PATENT OFFICE 1,996,896

CAGING AND RESETTING MEANS FOR GYROSCOPICALLY CONTROLLED NAVIGATION INSTRUMENTS

Joseph S. Bennett, Bradford, Pa.

Application April 28, 1932, Serial No. 607,929

16 Claims. (Cl. 33—204)

My invention relates to gyroscopic instruments and more particularly to improved caging and resetting mechanism for gyroscopically controlled navigation instruments of aircraft.

In application Serial Number 548,369, filed July 2, 1931, there is described a directional gyro which consists of a casing having formed therein a window opening thru which a compass scale may be seen. Inside the casing, and encircled by the scale, is an air driven gyroscope operated by suction from a venturi. The mounting of the gyroscope is such that the aircraft may turn freely around it in azimuth. Complete freedom as to angularity of displacement is accorded the gyroscope as well as the assembly of which said gyroscope forms a part.

As pointed out in the application above referred to, it is essential, if a true compass course is to be maintained, that the directional gyro be periodically checked and the gyroscopic assembly caged and re-set to compensate for drift. That this may be accomplished, suitable caging and re-setting mechanism is provided. In resetting or centralizing the gyroscopic assembly the directional gyro is made to correspond to the desired magnetic compass course or known geographical heading. Ordinarily the instrument is required to be caged and re-set at approximately twenty minute or one-half hour intervals.

One object of the present invention is to provide for gyroscopic instruments a caging and re-setting mechanism of improved design.

A further object of the invention is to provide a caging and re-setting mechanism adapted for operation under the influence of pneumatic pressure.

A further object of the invention is to provide for said caging and re-setting mechanism a remote or distant control.

A still further object of the invention is to so organize said pneumatic caging and re-setting mechanism as to admit of its operation thru the introduction behind said mechanism of atmospheric pressure.

Other and further objects and advantages of the invention will be hereinafter set forth.

In the drawings, wherein like reference characters denote like or corresponding parts, Fig. 1 is a longitudinal vertical sectional view of the caging and re-setting means. In this view the gyroscopic assembly of the instrument is shown semi-diagrammatically in side elevation, whereas the casing of the instrument is shown in much the same manner as the caging and re-setting means;

Fig. 2 is a plan view of the instrument casing showing the manner in which the spring for the caging cone is mounted;

Fig. 3 is a fragmentary side elevation of a portion of the re-setting means showing the detail construction of the centralizing cam;

Fig. 4 is a view similar to Fig. 3 showing the cam construction as viewed from a different angle;

Fig. 5 is a longitudinal vertical sectional view of the mechanism by means of which the operation of the caging and re-setting means is controlled.

Figure 1:
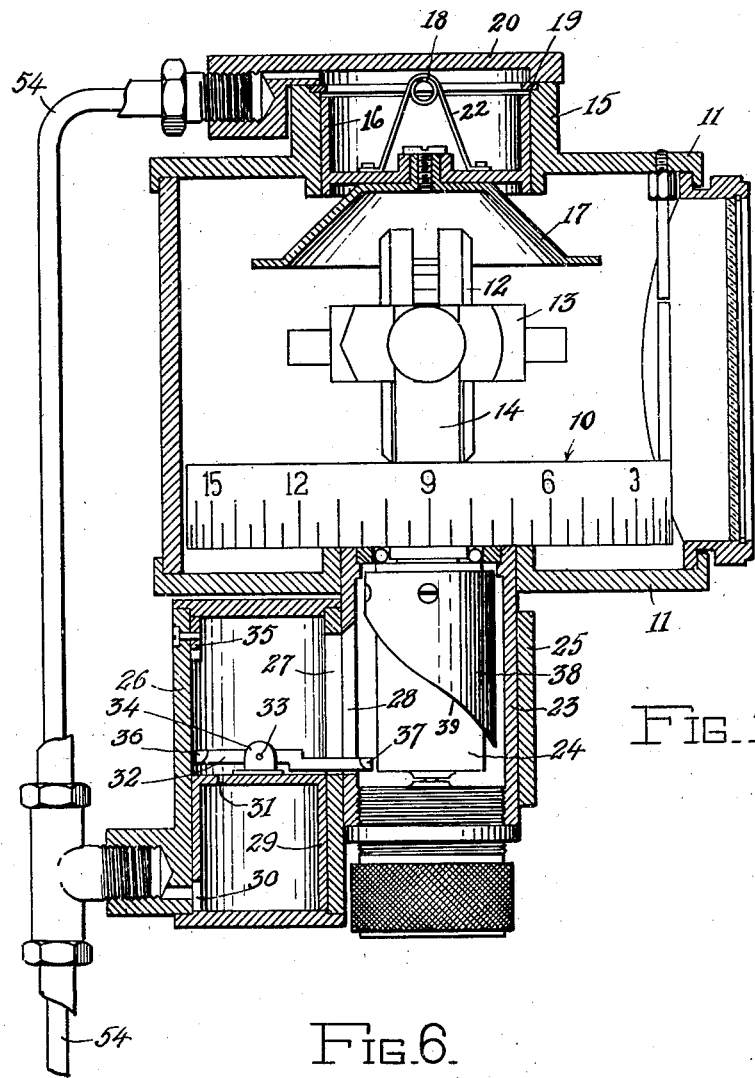
Figure 6:
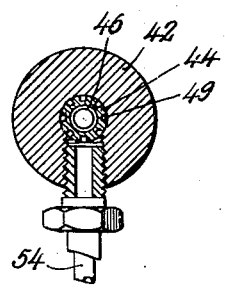
Fig. 6 is a section on the line 6—6 of Fig. 5.

In the embodiment of the invention selected for illustration, a navigation instrument generally similar to that described in application Serial Number 548,369, filed July 2, 1931, is shown. Said instrument comprises a so-called turntable 10 mounted on a shaft (not shown) journaled for rotation about a substantially vertical axis in a casing 11. Said turntable has indicated upon its periphery a suitable compass scale and its movement within the casing 11 is resisted by means of a gyroscope.

The gyro wheel or rotor 12 of the gyroscope is journaled for rotation about a horizontal axis in a suitable frame or gimbal 13. Said gimbal 13 is in turn journaled for rotation about a second horizontal axis in suitable supports or uprights 14 mounted on the turntable. Collectively the turntable, the rotor, and the gimbal frame, may be said to constitute a "gyroscopic assembly". Said assembly is adapted to maintain its position fixed in space due to its inertia, as the craft, in which it is installed, turns about it.

The rotor 12 is preferably air-driven. That this may be satisfactorily accomplished, the casing 11 is made substantially air-tight and thru it air is drawn by creating a pressure differential within and without said casing by means of a suction venturi. Obviously positive instead of negative pressure may be used to drive the rotor if desired.

The caging and re-setting mechanism is best illustrated in Fig. 1. At the top of the casing 11 there is provided a cylindrical housing 15. Within said housing a piston 16 is mounted for vertical movement. Said piston 16 has fastened to the head portion thereof a substantially dome-shaped caging device or cone 17, which said cone is movable with the piston to cage and release the gimbal as desired. Cam surfaces (not shown) formed on the gimbal frame cause said gimbal to seek a substantially horizontal position as pressure is exerted thereon by the inward movement of the cone. In this respect the operation of the caging means is exactly the same as described in said co-pending application.

To retract or withdraw the caging cone 17 out of engagement with the gimbal 13 a spring 18 is provided. Said spring (see Fig. 2) extends crosswise the housing 15, at the top thereof, and is fastened at its opposite ends to a retaining plate 19 clamped between the top of the housing and a removable cap or cover 20. Within the plate 19 openings 21 are formed. By fastening the ends of the spring 18 in said openings, the opposed series of which are staggered, the tension of said spring may be varied. A bracket 22 fastened to the head of the piston 16 and extending upwardly and over the spring 18 serves as a connection between said spring and piston.

At the bottom of the casing 11 there is provided a depending casing part 23. Within said casing part 23 the vertical shaft (not shown) upon which the turntable 10 is mounted, is journaled for rotation. Said shaft is preferably enclosed in a suitable cylindrical housing 24 and the weight mass of the entire assembly, including said shaft and housing, is preferably borne on the end of a pivot pin bearing in much the same manner as disclosed in said co-pending application.

To the rear of the casing part 23, and fastened thereto by its fitting engagement around said part, is an attachment 25 including a cylinder 26. Said cylinder 26 is preferably disposed directly behind said casing part and has formed therein a vertical slot 27. The slot 27 is in coincidence with a similar slot 28 formed in the rear wall of the casing part 23.

Within the cylinder 26 a piston 29 is mounted for vertical movement. Said piston has formed therein at the base of its skirt portion an opening 30 and has formed in its head portion a smaller opening 31. The purpose of said openings will be later described. On the top side of the piston head is mounted an arm 32. Said arm, intermediately of its ends, is pivoted as at 33 to a fitting 34 fastened to the piston. In the absence of pressure behind the piston, it (the piston) is adapted to occupy the position indicated in Fig. 1 so as to bring the head of the piston substantially flush with the lower end of the slot 27—28. Thru said slot, one end of the arm 32 projects into the casing part 23, and, as the piston is moved, said arm is adapted to travel along said slot until its opposite end makes contact with a so-called V-block 35 fastened to and within the cylinder 26 at its upper end. The ends of the arm 32 are given a knife edge as indicated at 36 and 37 respectively to insure accurate centralization of the gyroscopic assembly.

Around the housing 24, and rotatable with it, and hence with the gyroscopic assembly, is fastened a cylinder 38. Said cylinder is provided with a suitable cam surface 39 with which the knife edge end 37 of the arm 32 is adapted to make contact as the piston is raised. The shape of the cam surface is best illustrated in Figs. 3 and 4. At opposite sides of a plane passing vertically thru the upper and lower apices of the cam, the cam surface is symmetrical. By shaping the cam and fitting it to the gyroscopic assembly so that the arm 32 when raised to its uppermost position is held at the upper apex of the cam, the assembly, regardless of its then position due to precession, is automatically and accurately re-set or centralized.

The means for controlling the pressure differential relied upon to actuate the caging and re-setting means is best illustrated in Fig. 5. Said control means may be distantly removed from the gyroscopic instrument or it may be mounted closely adjacent to it. It comprises a casing 40 within which a hollow push button 41 is fitted. The casing 40 is fastened by any suitable means to an instrument board or other suitable support. Over the inner end of the casing is fastened an end piece 42 having formed therein a valve chamber 43 within which is mounted a valve 44. The valve 44 is provided with a stem 45 normally projecting into the hollow of said casing.

By means of a spring 46 the valve 44 is yieldingly held in engagement with its seat 47 and the valve stem 45 in engagement with the inner closed end of the push button 41. To unseat the valve it is only necessary to exert sufficient pressure on the button 41 to compress the valve spring 46. A cap or cover plate 48, against which one end of the spring 46 is adapted to bear, provides an end closure for the hollow end piece 42. Grooves 49 formed on the exterior surface of the valve 44 provide air passages leading to the valve chamber.

The push button 41 is preferably hollow throughout and has confined within its hollow a metal gauze 50 which filters and cleans the inrushing air. Over the outer end of the hollow button a cap 51 having openings 52 formed therein is screwed. Said openings 52, together with openings 53 formed in the inner closed end of the push button, admit of an air in-rush when the valve is unseated due to the pressure differential within and without the instrument casing. By means of an air line 54 the valve chamber 43 and the cylinders 15 and 26 respectively are at all times in open communication. If desired, the push button 41 may be locked depressed by means of a pin 55 fastened to the casing 40 and fitting a bayonet or rightangle slot 56 formed in the side wall of the button.

In actual practice the instrument illustrated is to be used as a compass which rough air and violent turns cannot affect in any way whatsoever. It will maintain any setting, for twenty minutes or more, with an accuracy of less than three degrees of arc. At approximately twenty minute to one-half hour intervals, however, it should be checked and re-set as hereinbefore indicated.

To re-set the instrument it is only necessary to press in the push button 41. Due to the pressure differential within and without the casing 11, air under atmospheric pressure enters the line 54 the moment the valve 44 is unseated. As air enters behind the piston 29 thru the opening 30 formed in the piston skirt, said piston, and the arm 32 mounted thereon, move upwardly. Upward movement of the arm 32 will cause the inner end 37 thereof to contact with and ride freely along the surface of the cam 39. The piston 29 being incapable of rotation and the cam 39 being fastened to and freely rotatable with the gyroscopic assembly, obviously the gyroscopic assembly is freely rotatable by and as a result of the upward movement of said piston.

To insure accurate centralization in re-setting the assembly, the high point of the cam 39 is made to correspond exactly with the zero marking on the compass scale. As the arm 32 approached the upper end of the guide slot 27—28, its outer end 36 comes in contact with the V-block 35. Such contact causes the arm 32 to rock about its pivot 33 and at the same time causes the end 37 of the arm to snugly fit the apex provided at the high point of the cam. It is this latter final movement of the arm 32 upon which reliance is placed to obtain the desired accuracy.

Simultaneously with the upward movement of the piston 29 the piston 16 is moved inwardly or toward the gyroscopic assembly. The cylindrical housing 15 is also open to the air line 54. As air under atmospheric pressure enters behind the piston 16, the caging cone 17 fastened thereto is forced inwardly or downwardly. Its continued movement in a downward direction results in a caging of the gimbal. Such inward movement of the cone 17 is at all times opposed by the cross-spring 18 carried at the top of the cylindrical housing.

By means of the bayonet slot 56 the push button 41 may be locked in its "pressed in" position. This is accomplished by merely turning the button. Unless locked, the moment pressure on the button is withdrawn, it (the button) is forced outwardly and the valve 44 reseated thru the action of the valve spring 46. With the valve closed or re-seated a pressure equalization on opposite sides of the pistons 29 and 16 is immediately set up. The opening 31 plus leakage past the pistons is instrumental in effecting pressure equalization quickly. As pressure equalization occurs the pistons 29 and 16 automatically assume that position indicated in Fig. 1 whereby a re-caging and re-setting of the assembly may be instantaneously and automatically similarly accomplished.

From the above, taken in connection with the accompanying drawings, it is obvious that provision is made (1) for pneumatic operation of the caging and re-setting mechanism, (2) for the control of said mechanism by means of a push button, (3) for the utilization of atmospheric pressure as the actuating force, (4) for cleansing the air utilized in actuating the mechanism, (5) for obtaining extreme accuracy, and (6) for installing the control unit at a point remote from the instrument where remote control is desired.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What I claim is:

1. In a navigation instrument, a gyroscope, a casing within which said gyroscope is enclosed, a chamber formed in the top casing wall, a member pneumatically separating said chamber from said casing, said member being movable toward and from said gyroscope through the controlled introduction to said chamber of fluid pressure, a device for caging said gyroscope fastened to and responsive in its movement to the movement of said member, a spring adapted to urge said caging device at all times toward a non-caging position, and a control device operable to regulate the pressure in said chamber.

2. In a navigation instrument, a casing within which air at less than atmospheric pressure is adapted to be normally maintained, a gyroscope enclosed within said casing, a chamber, a member pneumatically separating said chamber from said casing, said member being movable through the controlled introduction to said chamber of air at atmospheric pressure, a device for caging said gyroscope fastened to and responsive in its movement to the movement of said member, and a control device operable to admit to said chamber air at atmospheric pressure.

3. In a navigation instrument for aircraft, in combination, a casing within which air at less than atmospheric pressure is adapted to be normally maintained, an assembly including a gyroscope enclosed within said casing, means including a chamber and a member movable therein under the influence of differential air pressure between said casing and chamber, mechanism operated by said member for engaging said gyroscope to cage and release said gyroscope upon movement of said member, respectively, according to whether the pressure in said chamber behind said member is at a pressure greater than, or substantially equal to, the pressure in said casing, and a control device manually operable to regulate the pressure in said chamber.

4. In a navigation instrument for aircraft, an assembly including a gyroscope, a casing within which said assembly is enclosed, a pressure chamber, an operating member movable within said pressure chamber, and pneumatically separating the chamber and casing, mechanism for caging said gyroscope mounted within said casing and fastened to said member, said mechanism being movable toward said assembly as fluid under pressure is introduced to said chamber behind said member, and said mechanism, in the absence of fluid pressure within said chamber being adapted normally to occupy a position within said casing out of engagement with said assembly, and a control device manually operable to admit of the introduction to said chamber of fluid under pressure whereby said gyroscope may be caged and uncaged at will.

5. In a navigation instrument, a gyroscopic assembly including an indicating means, a cam carried by and movable with said assembly, a casing within which said assembly is enclosed, a chamber, a member separating said chamber from said casing, said member being movable through the controlled introduction to said chamber of fluid pressure, mechanism responsive in its movement to the movement of said member adapted to re-set said indicating means by its engagement with said cam, and a control device operable to regulate the pressure in said chamber.

6. In a navigation instrument, a gyroscopic assembly including a freely rotatable indicating means having indicated thereon a compass scale, a cam surface carried by and rotatable with said indicating means, said cam having a surface shape such that an apex is provided in coincidence with a selected marking on said scale, the surface of the cam receding in opposite directions from said apex, a casing within which said assembly is enclosed, a chamber, a member separating said chamber from said casing, said member being movable through the controlled introduction to said chamber of fluid pressure, mechanism responsive in its movement to the movement of said member adapted to re-set said indicating means by its engagement with said cam, and a control device operable to regulate the pressure in said chamber.

7. In a navigation instrument for aircraft, in combination, a casing within which air at less than atmospheric pressure is adapted to be normally maintained, an assembly including a gyroscopically controlled indicating means within said casing, means including a chamber and a member movable therein under the influence of differential air pressure between said casing and chamber, mechanism operated by said member for engaging said assembly to re-set and release the assembly upon movement of said member, respectively, according to whether the pressure in said chamber behind said member is at a pressure greater than, or substantially equal to, the pressure in said casing, and a control device manually operable to regulate the pressure in said chamber.

8. In a navigation instrument, a casing within which air at less than atmospheric pressure is adapted to be normally maintained, a gyroscopically controlled indicating means enclosed within said casing, a chamber, a member pneumatically separating said chamber from said casing, said member being movable through the controlled introduction to said chamber of air at atmospheric pressure, mechanism responsive in its movement to the movement of said member to re-set said indicating means, and a control device operable to admit to said chamber air at atmospheric pressure.

9. In a navigation instrument for aircraft, in combination, an assembly including an indicating means and a gyroscope by means of which rotation of said indicating means is resisted, a cam carried by and rotatable with said assembly, mechanism operable by fluid pressure to engage said cam and by its engagement therewith rotate said assembly to re-set said indicating means, said mechanism being adapted automatically to disengage said cam immediately the fluid pressure on said mechanism is relieved, and a pressure control device for said mechanism manually operable to cause said mechanism to engage said cam at will.

10. In a navigation instrument for aircraft, a gyroscopic assembly including a freely rotatable indicating means, a casing within which said assembly is enclosed, a pressure chamber, an operating member movable within said pressure chamber, and pneumatically separating the chamber and casing, mechanism for rotating said assembly and re-setting said indicating means, said mechanism being fastened to said member and movable into engagement with said assembly as fluid under pressure is introduced to said chamber behind said member, said mechanism being extended within said casing and in the absence of fluid pressure within said chamber being adapted automatically to move to a position out of engagement with said assembly, and a control device manually operable to admit of the introduction to said chamber of fluid under pressure whereby said assembly may be engaged and disengaged at will.

11. In a navigation instrument for aircraft, a freely rotatable assembly having indicated thereon a compass scale, said assembly including a gyroscope, a cam surface carried by and rotatable with said assembly, said cam having a surface shape such that an apex is provided in coincidence with a selected marking on the compass scale, mechanism operable by fluid pressure to engage said cam and by its engagement therewith rotate and re-set said assembly, said mechanism being adapted automatically to disengage said cam immediately the fluid pressure on said mechanism is relieved, and a pressure control device for said mechanism manually operable to cause said cam to be engaged and disengaged at will.

12. In a navigation instrument, a gyroscopic assembly including a freely rotatable indicating means, a casing within which said assembly is enclosed, a pressure chamber formed at one side of the casing wall, a member within said pressure chamber pneumatically separating the chamber from said casing, said member being movable in one direction through the controlled introduction to said chamber behind said member of fluid under pressure and being movable in the opposite direction under the action of gravity when said fluid pressure is relieved, mechanism for rotating said assembly and re-setting said indicating means, said mechanism being carried by said member and movable thereby into and out of engagement with said assembly, and a control device manually operable to admit to said pressure chamber behind said member air under pressure greater than the air pressure within said casing.

13. In a navigation instrument, an assembly including a gyroscope and an indicating means, a casing within which said assembly is enclosed, separate chambers, a member separating one said chamber from said casing, said member being movable through the controlled introduction to said chamber of fluid pressure, a device for caging said gyroscope fastened to and responsive in its movement to the movement of said member, a second member separating the other said chamber from said casing, said second member being movable through the controlled introduction to said second chamber of fluid pressure, mechanism responsive in its movement to the movement of said second member adapted to re-set said indicating means, and means operable to regulate the pressure in both said chambers.

14. In a navigation instrument, an assembly including a gyroscope and an indicating means, a casing within which said assembly is enclosed, separate chambers, a member separating one said chamber from said casing, said member being movable through the controlled introduction to said chamber of fluid pressure, a device for caging said gyroscope fastened to and responsive in its movement to the movement of said member, a second member separating the other said chamber from said casing, said second member being movable through the controlled introduction to said second chamber of fluid pressure, mechanism responsive in its movement to the movement of said last mentioned member adapted to re-set said indicating means, and a single means operable to regulate simultaneously the pressure in both said chambers.

15. In a navigation instrument for aircraft, in combination, an assembly including an indicating means and a gyroscope having three degrees of freedom by means of which rotation of said indicating means is resisted, mechanism operable by fluid pressure to engage said assembly and by its engagement therewith cage said gyroscope, said mechanism being adapted automatically to disengage said assembly and release said gyroscope immediately the fluid pressure on said mechanism is relieved, a cam carried by and rotatable with said assembly, mechanism operable by fluid pressure to engage said cam and by its engagement therewith rotate said assembly and re-set said indicating means, said last mentioned mechanism being adapted automatically to disengage said cam immediately the fluid pressure on said last mentioned mechanism is relieved, and a pressure control device manually operable at will to simultaneously move both said mechanisms to caging and re-setting positions.

16. In a navigation instrument for aircraft, in combination, an assembly including a gyroscope and a freely rotatable indicating means, a casing within which said assembly is enclosed, a chamber formed in the top casing wall, a member pneumatically separating said chamber from said casing, said member being movable within said chamber toward said assembly through the controlled introduction to said chamber behind said member of fluid under pressure, a spring adapted normally to maintain said member in a retracted position within said chamber, mechanism for caging said gyroscope fastened to said member and movable thereby into and out of engagement with said assembly, a second chamber formed at one side of the casing wall, a member pneumatically separating said second chamber from said casing, said last mentioned member being movable within said second chamber in a direction parallel to the axis of rotation of said indicating means through the controlled introduction to said chamber behind said last mentioned member of fluid under pressure, said last mentioned member, under the action of gravity, being adapted normally to assume a retracted position within said second chamber, mechanism for re-setting said indicating means fastened to said last mentioned member and movable thereby into and out of engagement with said assembly, a pipe line in open communication with both said chambers, and a control device within said pipe line manually operable to admit thereto air under pressure for actuating both said members simultaneously.

JOSEPH S. BENNETT.